June 14, 1960  A. J. LAVOIE ET AL  2,940,695
APPARATUS FOR COUPLING A RADAR SYSTEM TO AN AUTOPILOT
Filed Oct. 9, 1956  3 Sheets-Sheet 1

WITNESSES:
Bernard R. Gieguay
Leon M. Garman

INVENTORS
Andrew J. Lavoie, James E. Holthaus,
James Peters, and Henry A. Leone.
BY
ATTORNEY

United States Patent Office 2,940,695
Patented June 14, 1960

2,940,695

APPARATUS FOR COUPLING A RADAR SYSTEM TO AN AUTOPILOT

Andrew J. Lavoie, Millersville, James E. Holthaus, Catonsville, James Peters, Halethorpe, and Henry A. Leone, Arbutus, Md., assignors to Westinghouse Electric Corporation, East Pittsburgh, Pa., a corporation of Pennsylvania Filed Oct. 9, 1956, Ser. No. 614,886

10 Claims. (Cl. 244—77)

This invention relates to aircraft control systems and, more particularly, to means for coupling pitch and yaw signals from a radar system to an automatic pilot.

Although not limited thereto, the present invention is particularly adapted for use in fire control radar systems where it is desired to direct an interceptor aircraft, through an automatic pilot, in an attack path leading to firing position on a target such as another aircraft. Prior to this invention, it was usually necessary for a pilot, after detecting a target on his radar scope, to manually maneuver the aircraft into an attack path by centering a steering dot on the radar scope. This method has certain disadvantages in that the accuracy of the interceptor path can be easily impaired during manual maneuvering by distractions to the pilot produced by adjacent aircraft, radio communications and instrument panel monitoring, all of which may require his attention.

It is a primary object of this invention to provide apparatus for coupling directional signals from an aircraft radar system to an automatic pilot, whereby the signals from the radar system will automatically direct the aircraft along a predetermined flight path. In accordance with the invention, hereinafter described, pitch and yaw signals from the radar system are fed through two separate signal channels to the automatic pilot. Control of the aircraft is accomplished in three phases. In the first phase, pitch and yaw signals having a high rate of change in voltage are amplified in their respective channels and used to feed the corresponding channels of the automatic pilot to quickly establish the aircraft on a predetermined flight path. In the second phase, after the aircraft has been established on the desired flight path, the pitch and yaw signals reach a more or less steady state, low voltage level. In this phase the gain of the channels is raised, and an integrating network is inserted into each channel to provide extremely accurate control of the aircraft along its flight path. In the third phase, the yaw channel of the coupler is shorted out and only pitch signals are received by the automatic pilot to steer the aircraft in elevation. In the particular embodiment of the invention shown and described herein, this third phase is necessary in order to stabilize the aircraft in the final stages before the rockets of the interceptor aircraft are fired at the target aircraft.

The above and other objects and features of the invention will become apparent from the following detailed description taken in connection with the accompanying drawings which form a part of this specification, and in which.

Figure 1:
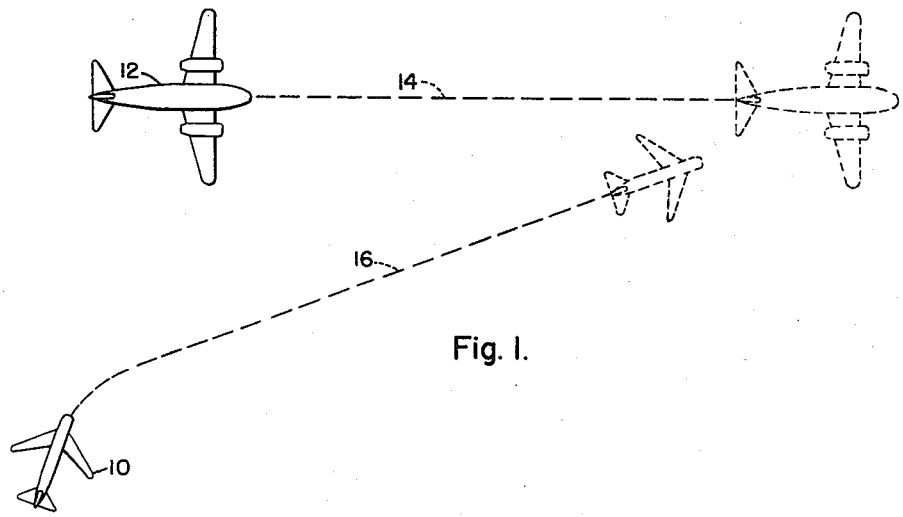
Figure 1 is a schematic view illustrating one use of the present invention in connection with an interceptor aircraft attacking another aircraft.

Referring to Fig. 1, there are shown typical angular and spatial relationships existing in azimuth between an interceptor aircraft 10 and a target aircraft 12 flying along a flight path 14. Initially, the radar system of the interceptor 10 will scan the skies for possible targets. When a target aircraft such as 12 comes within the range of the radar, it will produce an indication on the interceptor pilot's radar scope telling him of the fact. In accordance with the present invention, the interceptor pilot will then close a switch which functions to feed the information received by the radar into a computer. The information from the radar will consist, essentially, of the range and the rate of change of range between the interceptor 10 and the target 12, and also the rate of change of angular error between the center line of the interceptor and the target. From these factors, the computer will produce pitch and yaw error signals which are fed through the radar coupler of the present invention to an automatic pilot which then causes the interceptor to fly along a flight path 16 so that it will intercept the target at some future point.

Figure 2:
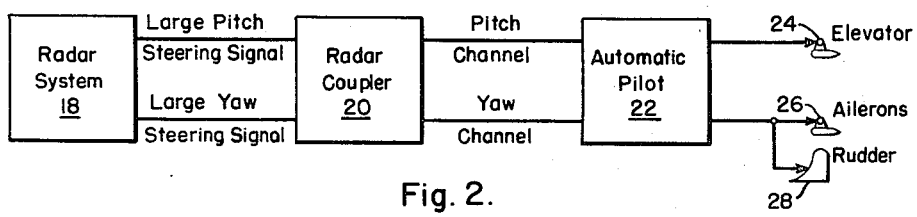
Fig. 2 is a block diagram of the aircraft control system of the present invention, including radar apparatus and automatic pilot. The legends on the figure identify the first phase of operation of the system.
Figure 3:
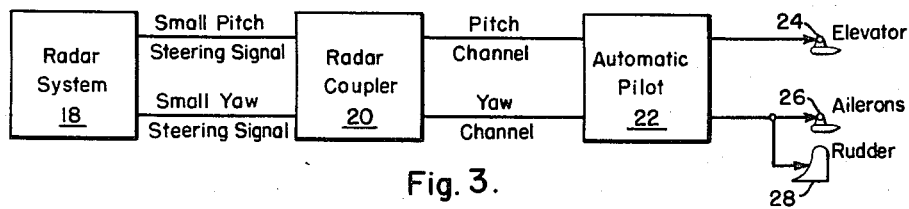
Fig. 3 is a block diagrams similar to that of Fig. 2 except that the legends now identify the second and third phases of operation of the system.

The general control scheme is shown in Figs. 2 and 3 and comprises a radar system 18 which feeds pitch and yaw signals to the radar coupler 20 of the present invention. The output of the coupler is, in turn, fed through the pitch and yaw channels to the automatic pilot 22 which controls the elevator 24, ailerons 26 and rudder 28. As will be understood, a system of this sort comprises a servo loop in which signals from the radar system 18 control the aircraft through the automatic pilot 22; and the direction of flight produced by the autopilot, in turn, determines the characteristics of the output signals from the radar.

Figure 5:
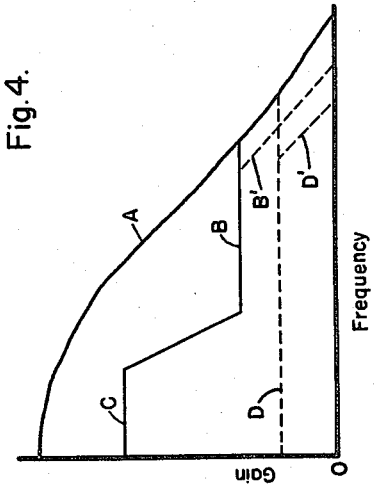
Fig. 5 is a graphical illustration of the operation of the radar coupler shown in Fig. 4.

Any servo loop of this type is a complex servo-mechanism containing active elements and a feedback. It is, therefore, possible for the servo loop to become unstable and oscillate. Whether or not the system will be stable for a particular input frequency (i.e., rate of change of the input signal) will depend, among other things, upon the gain of the amplifier elements in the loop. For some values of amplification gain, the system will oscillate; while for others it will be stable. Generally speaking, the amplification gain of the loop can be increased without losing stability as the input frequency is decreased. This factor is illustrated in Fig. 5. When, for a given system, the frequency-gain point lies above curve A, the system will be unstable; whereas, when it lies below curve A, the system will be stable. It can be readily seen that the gain of the loop may be increased as the frequency decreases while still maintaining stability.

When the interceptor 10 initially detects the target 12, large rapidly changing error signals will be fed from the radar system to the automatic pilot to quickly establish the interceptor aircraft 10 on the attack path 16. These signals are amplified at low gain in the radar coupler to prevent the system from oscillating and losing control. This condition is shown in Fig. 2. After the interceptor 10 has been established on its attack path 16, the sum of the pitch and yaw signals will be less than 1½ degrees of the total angular error. This means, in effect, that any error signals will be slowly varying or of very low frequency. Consequently, the gain of the amplifiers in the coupler is raised by a factor of 7 to provide extremely accurate control of the interceptor in the final stage of attack; and an integrating network is inserted into each of the channels to stabilize the system. This condition is shown in Fig. 3. Finally, the yaw channel is shorted out, and only pitch signals are used to steer the interceptor in elevation, thereby further stabilizing the aircraft in the final stages of attack.

General operation of the radar coupler

Figure 4:
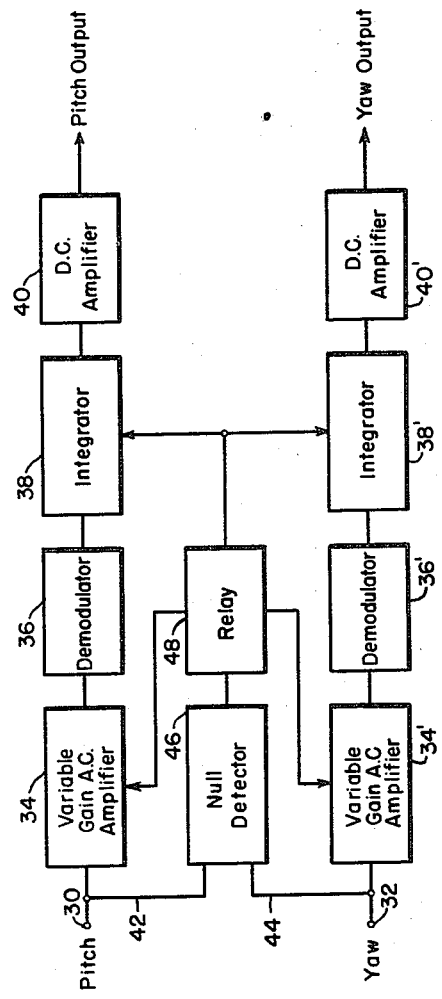
Fig. 4 is a block diagram of the radar coupler of the present invention.

Referring to Fig. 4, the output of the pitch channel from the radar system applied to input terminal 30 of the radar coupler is a 400-cycle per second signal, the polarity of which indicates the sense of the error and the amplitude of which indicates the magnitude of the error. Thus, if the 400-cycle per second signal is negative with respect to a reference point, it may, for example, indicate that the aircraft should climb in altitude to get on the attack path; whereas, if the signal is positive, the aircraft should descend. Likewise, positive or negative 400-cycle per second signals are applied to input terminal 32 to indicate that the aircraft should fly to the right or left, respectively, to get on the attack path.

The pitch signals are fed through a variable gain, alternating current amplifier 34 to a demodulator 36 which produces a direct current output voltage, the polarity of which is dependent upon the polarity of the 400-cycle per second signal from amplifier 34 and the magnitude of which is proportional to the amplitude of the aforesaid 400-cycle per second signal. From the demodulator 36, the signals pass through an integrating network 38, which may be switched into or out of the channel, and then to a direct current amplifier 40. The output of the amplifier 40 is then applied to the automatic pilot of the system to control the aircraft in pitch. In a similar manner, 400-cycle per second signals on terminal 32 pass through a variable grain amplifier 34', a demodulator 36', an integrating network 38', which may be switched into or out of the channel, and a direct current amplifier 40' to control the aircraft in yaw. Both of the channels are identical in operation, the only difference being in the signals applied to their respective input terminals.

Signals on terminals 30 and 32 are also applied via leads 42 and 44, respectively, to a null detector 46 which will actuate a relay device 48 when the sum of the amplitudes of the two signals applied to terminals 30 and 32 falls below a predetermined amplitude. The relay device 48, in turn, increases the gain of the amplifiers 34 and 34' and also switches the integrating networks 38 and 38' into the channels when the sum of the input signals falls below the aforesaid predetermined amplitude.

The operation of the system is shown graphically in Fig. 5. Initially, when the pitch and yaw signals are of high amplitude and rapidly changing, the gain of the channels will be low, as indicated by line D. When the sum of the pitch and yaw signals falls below the aforesaid predetermined amplitude, null detector 46 will actuate relay 48 to increase the gain of amplifiers 34 and 34' and switch into the circuit the integrators 38 and 38', providing a response for each channel as indicated by line C—B in Fig. 5. It will be understood that the shape of curve C—B is determined to a large extent by the values of resistor 188 and capacitor 190 in the integrator 38, and the corresponding elements in the integrator 38'. In actual practice, the changes in the slope of curve C—B could be expected to be more gradual than those illustrated. Curve C—B and curve D are caused to, in effect, taper off at B' and D' respectively, inside of the limit of stability curve A as a result of the response characteristic of the servo at high frequencies. Thus, the frequency-gain characteristic of the system is always below curve A so that the system remains stable. The gain, however, is increased at lower frequencies to take advantage of the upswing in curve A and permit extremely fine control of the aircraft along its attack path.

Detailed description of the radar coupler

Figure 6:
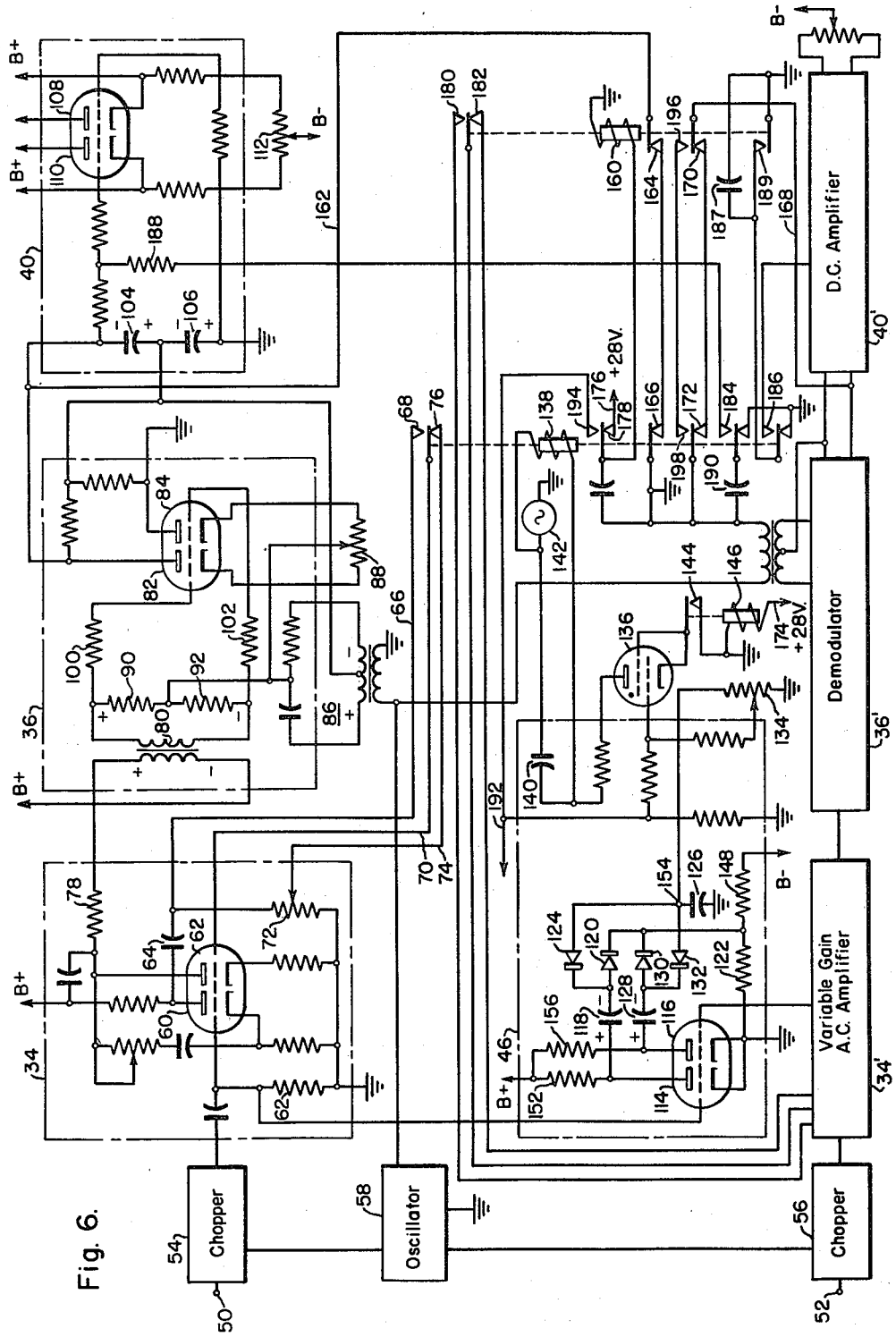
Fig. 6 is a detailed schematic diagram of the radar coupler shown in block form in Fig. 4.

In Fig. 6, elements which correspond to those shown in Fig. 4 are indicated by like reference numerals and are shown in block form or are enclosed by broken lines. Actually, the pitch and yaw output signals from the radar-computer system are direct current signals and are applied to input terminals 50 and 52, respectively. These signals are fed to choppers 54 and 56 which are supplied with a 400-cycle per second alternating current signal from oscillator 58. The outputs of the choppers 54 and 56, then, are the 400-cycle per second chopped, direct current signals which are fed to amplifiers 34 and 34'.

Since the pitch and yaw channels are substantially identical in construction, only the pitch channel is shown in detail in Fig. 6, whereas the yaw channel is shown in block form. The 400-cycle per second output signal from chopper 54 is applied between the grid and cathode of triode 60 in amplifier 34 by means of grid resistor 62. The output of triode 60 may be applied between the grid and cathode of a second triode 62 through one of two current paths. One of these paths includes capacitor 64, lead 66, contact 68 of relay 138 and lead 70. The other path includes capacitor 64, resistor 72, lead 74, contact 76 of relay 138 and lead 70. It can be readily seen that when the anode of triode 60 is connected to the grid of triode 62 through contact 68, the gain of the amplifier will be much higher than it will be when the output of triode 60 must pass through the dropping resistor 72.

From the anode of triode 62, the 400-cycle per second signals pass through resistor 78 and are applied across the primary winding of transformer 80 in demodulator 36. The demodulator 36 is of the type known as a reference demodulator. In this type of demodulator, the plate supply voltage of a detecting vacuum tube is a 400-cycle per second alternating current voltage in phase with the input signal. This plate supply voltage for triodes 82 and 84 in demodulator 36 is supplied from the oscillator 58. In the chopping process in chopper 54, the phase of the output signal is shifted somewhat with respect to the original 400-cycle per second signal from oscillator 58. In order to obtain maximum output from the demodulator 36, the chopped signal on the grids of triodes 82 and 84 should be in phase with the 400-cycle per second signal from oscillator 58 which is applied to these triodes. Consequently, a phase shift network, generally indicated at 86, is included between oscillator 58 and the plate supply voltage of triodes 82 and 84 to provide the necessary correcting phase shift.

It can be seen that since a source of alternating current voltage is applied through phase shift network 86 and resistor 88 to triodes 82 and 84, these triodes will periodically conduct. The chopped 400-cycle per second output signal of amplifier 34 is of one polarity, either positive or negative, with respect to ground. When the polarity of the signal appearing across the primary winding of transformer 80 is as shown, the grid of triode 82 will be positive with respect to its cathode, whereas the grid of triode 84 will be negative with respect to its cathode. This results from the fact that the center tap of resistors 90 and 92, connected across the secondary of transformer 80, is connected to the cathodes of the respective triodes; and the opposite ends of the secondary winding are connected to the grids of triodes 82 and 84 through resistors 100 and 102.

Assuming that the polarity of the input signal to demodulator 36 is as shown, triode 82 will conduct more heavily than triode 84 and will charge capacitors 104 and 106 with the polarity shown. Consequently, the grid of triode 108 will now be positive with respect to its cathode, whereas the grid of triode 110 will be negative with respect to its cathode. The bias on the cathodes of triodes 108 and 110 is adjusted by means of a variable tap on resistor 112 which is connected to a source of negative potential indicated by B.

If the polarity of the input signal to demodulator 36 should reverse, triode 84 will conduct more heavily than triode 82 and the potential on the anode of triode 82 will rise above ground potential. Consequently, capacitors 104 and 106 will be charged with a polarity opposite to that shown in the drawing, and triode 110, rather than triode 108, will have increased conduction. The outputs of triodes 108 and 110 are then used in the autopilot to cause the aircraft to ascend or descend in altitude, depending upon which of the triodes 108 or 110 is conducting more heavily.

The outputs of choppers 54 and 56 are also applied to the grids of two triodes 114 and 116, respectively, in null detector 46. The triodes 114 and 116 are operated as class A amplifiers. The plate circuit of triode 114 is divided into two current paths, one of which includes capacitor 118, rectifier 120 and resistor 122, and the other of which includes the capacitor 118, a rectifier 124 and a capacitor 126, one terminal of which is grounded. In a similar manner, the plate circuit of triode 116 is divided into one current path including capacitor 128, rectifier 130 and resistor 122, and a second current path including capacitor 128, a rectifier 132 and the capacitor 126. The junction of rectifiers 124 and 132 is connected through resistor 134 to ground, and this resistor acts as a grid resistor for a thyratron, generally indicated at 136. The plate circuit of thyratron 136 includes a relay coil 138, shunted by capacitor 140, and a source of alternating current voltage 142. The cathode and screen grid of thyratron 136 are connected to ground through the normally open contacts 144 of relay 146. A resistor 148 having one terminal connected to the junction of resistor 122 and rectifiers 120 and 130, has its other terminal connected to a source of negative potential to provide an approximate −1 volt bias across the resistor 134. Any signal present at either of the grids of the triodes 114 or 116 increases the voltage across resistor 134 from this point. The voltage across resistor 134 is applied, as shown, between the grid and cathode of the thyratron 136.

It can readily be seen that the plate circuit for each of the triodes 114 and 116 constitutes a voltage doubler. On the first half cycle of input voltage applied to the grid of triode 114, it will conduct and charge capacitor 118 as shown. Consequently, capacitor 118 will be charged from the plate supply for amplifier 114 with the polarity shown through resistor 152, rectifier 120 and resistor 122. On the next half cycle the charge accumulated on capacitor 118 will add to the plate signal voltage and discharge through rectifier 124 and capacitor 126. Consequently, the negative voltage at point 154 is increased. Likewise, on the first half cycle of a signal applied to the grid of triode 116, capacitor 128 will be charged from the plate supply for the triodes through resistor 156, rectifier 130 and resistor 122 with the polarity shown in the drawing. On the next half cycle when triode 116 conducts, capacitor 128 will be discharged through rectifier 132 and capacitor 126, thereby further increasing the negative voltage at point 154. When the negative voltage at point 154 reaches a predetermined magnitude, and assuming that relay 146 is energized, thyratron 42 will be cut off and the relay coil 138 will be deenergized. When the negative voltage at point 154 is removed, however, the source of alternating current plate voltage 142 will cause the thyratron 136 to conduct immediately. Capacitor 140 is used in an obvious manner to filter the rectified voltage appearing across relay coil 138 once thyratron 136 has fired.

Since capacitor 126 is the doubling capacitor for the voltage doubler in each of the plate circuits, thyratron 136 can be cut off in the presence of a signal on the grid of triode 114 alone, in the presence of a signal on the grid triode 116 alone, or in the presence of signals on the grids of both of the triodes 114 and 116. It will also be noted that the phase of the signals applied to triodes 114 and 116 is immaterial since the voltage build-up on capacitor 126 is cumulative.

When relay coil 138 and a second relay 160 are deenergized, as shown in the drawing, each of the channels will be shorted. That is, the pitch channel will be connected through lead 162, contact 164 of relay 160 and contact 166 of relay 138 to ground. Likewise, the yaw channel will be connected through lead 168, contact 170 of relay 160 and contact 172 of relay 138 to ground.

In operation, when the pilot of the interceptor aircraft detects a target on his radar scope, he will close a switch which will connect terminals 174 and 176 to a source of positive voltage marked +28 volts in Fig. 6. Consequently, relay 146 will be energized to close contact 144 and enable the thyratron 136 to operate. At this time, large pitch and yaw signals will be received from the radar system. Consequently, the output of null detector 46 at point 154 will be negative and will cut off thyratron 136. Under these conditions, relay 138 will remain deenergized; and its contacts will remain in the positions shown in Fig. 6. Relay 160, however, will be energized from the +28 volt source through contact 178 of relay 138 so that the positions of the contacts of relay 160 will be reversed with respect to those shown in the drawing. Under these conditions, the pitch channel will no longer be shorted since contact 164 will be open and the yaw channel will not be shorted since contact 170 will be open.

During this time, the anode of triode 60 is connected to the grid of triode 62 through resistor 72 and contact 76 of relay 138 so that the gain of amplifier 34 is at its lower value. In a similar manner, the corresponding tubes of the amplifier 34' in the yaw channel will be connected through contact 180 of relay 160 so that the gain of amplifier 34' is also at its lower value.

After the interceptor aircraft is established on its attack path, the output signals from choppers 54 and 56 will diminish in amplitude. The output of the null detector 46 at point 154 will, therefore, rise in voltage; and this voltage rise on the control grid of thyratron 136 will initiate conduction in the thyratron and energize relay 138 to reverse the positions of its contacts shown in Fig. 6.

The system is now operating in phase two. The anode of triode 60 in amplifier 34 is now connected directly to the grid of triode 62 through contact 68 of relay 138 so that the gain of the amplifier is materially increased. Relay 160 is no longer connected to the source of positive voltage at terminal 176 so that it becomes deenergized, and the gain of amplifier 34' in the yaw channel is raised by the closure of contact 182. The channels are not shorted during this time due to the fact that the connections at contacts 166 and 172 are now broken. Since contacts 184 and 186 of relay 138 are now closed, an integrator is switched into each channel which, in the pitch channel, constitutes resistor 188 and capacitor 190 which has one terminal grounded. In the yaw channel, the integrator path is through contact 186 of relay 138 and capacitor 187 to ground. Capacitor 187 will, of course, be shorted whenever contact 189 of relay 160 is closed.

When the interceptor aircraft is a certain predetermined distance away from the target aircraft, the range tracking portion of the radar system will apply a signal to terminal 192 which will energize relay 160 through contact 194 of relay 138. Consequently, the contacts of relay 160 will now be reversed with respect to the positions shown in Fig. 6, and the yaw channel will be shorted through lead 168, contact 196 of relay 160, and contact 198 of relay 138 to ground. The system is now operating in phase three wherein only pitch signals are fed the autopilot to steer the aircraft in elevation.

Although the invention has been described in connection with a certain specific embodiment, it will be readily apparent to those skilled in the art that various changes in form and arrangement of parts may be made to suit requirements without departing from the spirit and scope of the invention.

We claim as our invention:

1. In an aircraft control system in which pitch and yaw signals from a radar system control the operation of an automatic pilot, apparatus for coupling pitch and yaw signals from the radar system to the automatic pilot and comprising a signal channel for pitch signals and a signal channel for yaw signals, first means included in each of said channels for converting a direct current signal into an alternating current signal the instantaneous amplitude of which is proportional to the instantaneous voltage level of said direct current signal, a variable gain amplifier in each of said channels for amplifying the output of said first means, second means included in each of said channels for converting the output of said amplifier into a direct current signal, a device responsive to the output of the first means in each of said channels for producing an output signal when the sum of the amplitudes of the outputs of said first means in each channel is below a predetermined level, and means responsive to the output signal of said device for increasing the gain of the variable gain amplifier in each channel and for integrating the output of said second means in each channel.

2. In an aircraft control system in which pitch and yaw signals from a radar system control the operation of an automatic pilot, apparatus for coupling the pitch and yaw signals from the radar system to the automatic pilot and comprising a signal channel for pitch signals and a signal channel for yaw signals, a chopper in each of said channels for converting a direct current signal into an alternating current signal, a variable gain amplifier in each of said channels for amplifying the output of said chopper, a demodulator in each of said channels for converting the output of said amplifier into a direct current signal, a device responsive to the outputs of the choppers in said channels for producing an output signal when the sum of the outputs of the choppers in said channels falls below a predetermined level, and means responsive to the output signal of said device for changing the gain of said variable gain amplifier in each channel.

3. In an aircraft control system in which pitch and yaw signals from a radar system control the operation of an automatic pilot, apparatus for coupling the pitch and yaw signals from the radar system to the automatic pilot and comprising a signal channel for pitch signals and a signal channel for yaw signals, a chopper in each of said channels for converting a direct current signal into an alternating current signal, a variable gain amplifier in each of said channels for amplifying the output of said chopper, a demodulator in each of said channels for converting the output of said amplifier into a direct current signal, a device responsive to the outputs of the choppers in said channels for producing an output signal when the sum of the outputs of the choppers in said channels falls below a predetermined level, and means responsive to the output signal of said device for integrating the output of the demodulator in each channel.

4. In an aircraft control system in which pitch and yaw signals from a radar system control the operation of an automatic pilot, apparatus for coupling the pitch and yaw signals from the radar system to the automatic pilot and comprising a signal channel for pitch signals and a signal channel for yaw signals, a variable gain alternating current amplifier included in each of said channels, means included in each of said channels for converting the output of said amplifier into a direct current signal, a device responsive to pitch and yaw signals for producing an output signal when the sum of the instantaneous voltages of the pitch and yaw signals falls below a predetermined amplitude, and means responsive to the output of said device for changing the gain of the variable gain amplifier in each channel.

5. In an aircraft control system in which pitch and yaw signals from a radar system control the operation of an automatic pilot, apparatus for coupling the pitch and yaw signals from the radar system to the automatic pilot and comprising a signal channel for pitch signals and a signal channel for yaw signals, a variable gain alternating current amplifier included in each of said channels, means included in each of said channels for converting the output of said amplifier into a direct current signal, a device responsive to pitch and yaw signals for producing an output signal when the sum of the instantaneous voltages of the pitch and yaw signals falls below a predetermined amplitude, and means responsive to the output of said device for integrating the output of said converting means in each channel.

6. In an aircraft control system in which pitch and yaw signals from a radar system control the operation of an automatic pilot, apparatus for coupling the pitch and yaw signals from the radar system of the automatic pilot and comprising a signal channel for pitch signals and a signal channel for yaw signals, a variable gain amplifier included in each of said channels, a device responsive to pitch and yaw signals for producing an output signal when the sum of the instantaneous voltages of the pitch and yaw signals falls below a predetermined level, and means responsive to the output of said device for changing the gain of the variable gain amplifier of each channel.

7. In an aircraft control system in which pitch and yaw signals from a radar system control the operation of an automatic pilot, apparatus for coupling the pitch and yaw signals from the radar system to the automatic pilot and comprising a signal channel for pitch signals and a signal channel for yaw signals, a device responsive to pitch and yaw signals for producing an output signal when the sum of the instantaneous voltages of the pitch and yaw signals falls below a predetermined level, and means responsive to the output signal of said device for integrating the pitch and yaw signals in their respective channels.

8. In an aircraft control system in which signals from a radar system control the operation of an automatic pilot, a signal channel for coupling signals from the radar system to the automatic pilot, said channel including means for converting a direct current signal into an alternating current signal, a variable gain amplifier for amplifying said alternating current signal, means for converting the output of said amplifier into a direct current signal, and integrating means adapted to be rendered selectively operative and inoperative in accordance with changes in the amplitude of signals from the radar system for integrating said last-mentioned direct current signal.

9. In an aircraft control system in which signals from a radar system control the operation of an automatic pilot, a signal channel for coupling signals from the radar system to the automatic pilot, said channel including a variable gain alternating current amplifier, means for converting the output of said amplifier into a direct current signal, and integrating means adapted to be rendered selectively operative and inoperative in accordance with changes in the amplitude of signals from the radar system for integrating said direct current signal to thereby increase the guiding accuracy of said automatic pilot in response to signals of small amplitude.

10. In an aircraft control system in which pitch and yaw signals from a radar system control the operation of an automatic pilot, apparatus for coupling the pitch and yaw signals from the radar system to the automatic pilot and comprising means for separately amplifying the pitch and yaw signals at a low gain, and means responsive to the sum of the voltage levels of the pitch and yaw signals for raising the gain of said amplifying means when the sum of the signals falls below a predetermined level.

References Cited in the file of this patent

UNITED STATES PATENTS

| | | |
|---|---|---|
| 2,307,023 | Cooke et al. | Jan. 5, 1943 |
| 2,448,007 | Ayres | Aug. 31, 1948 |
| 2,538,772 | Ferrill | Jan. 23, 1951 |
| 2,664,254 | Hendrickson | Dec. 29, 1953 |
| 2,709,053 | Pine | May 24, 1955 |
| 2,827,250 | Rusler Jr. | Mar. 18, 1958 |